.514,304
Patented May 26, 1970

3,514,304
CORROSION-INHIBITING TITANIUM
DIOXIDE PIGMENTS
Kenneth Binnis, London, England, assignor to British
Titan Products Company Limited, Billingham, Durham
County, England, a British company
No Drawing. Original application June 9, 1965, Ser. No.
462,744, now Patent No. 3,345,187, dated Oct. 3, 1967.
Divided and this application June 22, 1967, Ser. No.
647,955
Claims priority, application Great Britain, July 31, 1964,
30,361/64
Int. Cl. C09c 1/36
U.S. Cl. 106—300          10 Claims

ABSTRACT OF THE DISCLOSURE

Corrosion-inhibiting surface coating compositions, and in particular, primers, normally require the use of pigments which are highly colored. By coating titanium dioxide pigment particles with triisopropanolamine or the benzoates thereof or with the phosphates of trialkanolamines such as triethanolamine or triisopropanolamine, an improved pigmentary product is obtained which may be used in primer coatings without the problems associated with the use of highly colored pigments.

CROSS-REFERENCE TO RELATED APPLICATIONS

This application is a divisional of United States application Ser. No. 462,744, filed June 9, 1965 now Pat. No. 3,345,187. Applicant claims priority from British application Ser. No. 30,361, filed July 31, 1964, in Great Britain.

The present invention relates to improved pigments for use in corrosion-inhibiting surface coating compositions and to the compositions containing them.

Corrosion-inhibiting surface coating compositions, particularly priming compositions for application to the surface of ferrous metals, suffer from a number of disadvantages. For example, the pigments having corrosion-inhibiting properties which are used in such compositions are usually highly colored and where the structure to which the corrosion-inhibiting composition is applied is to be finished by the application of a decorative coating, for example, an oleoresinous gloss paint, it is frequently necessary to cover the corrosion-inhibiting coating composition with an undercoat of the appropriate color before the final decorative coat can be satisfactorily applied. This is, of course, particularly necessary when the final coating is light in color.

In addition, previously used corrosion-inhibiting pigments have a lower opacity than $TiO_2$ pigments and the present invention provides pigments of increased opacity combined with corrosion-inhibiting properties.

The pigments of the present invention are provided with a coating of corrosion-inhibiting material on the surface of the pigmentary particles, thus the corrosion-inhibiting material is placed where it achieves the greatest effect and is used most efficiently.

It is an object of this invention to provide improved pigments for use in surface coating compositions, particularly those having corrosion-inhibiting properties, and compositions containing the pigments.

Accordingly, the present invention comprises pigmentary titanium dioxide particles coated with triisopropanolamine or a benzoate thereof, or with a phosphate of an alkanolamine of the general formula

where R represents a divalent aliphatic radical which may be the same or dicerent containing 2 or 3 carbon atoms.

The invention also includes a process comprising coating pigmentary titanium dioxide particles with compounds selected from the above group and surface coating compositions containing the coated pigmentary titanium dioxide particles of the present invention.

The titanium dioxide particles of the present invention are preferably of pigmentary size, for example, having a mean weight particle size in the range 0.15 micron to 0.35 micron and particularly in the range 0.2 micron to 0.3 micron. Where they are predominantly of the rutile modification they should preferably contain at least 90% and preferably at least 95% of this form.

The particles may or may not be coated with materials other than those of the present invention but it is preferred that there should be present on the particles a coating of at least one other material, for example, a metal oxide (which term includes silica).

Examples of metal oxides which may be present are oxides of aluminium, titanium, cerium, zirconium and/or silicon. Such oxides are conveniently applied, either singly or in combination, before the coatings of the present invention, in amounts in the range from 0.1% to 5%, particularly from 0.5% to 3% (by weight on $TiO_2$).

The pigment particles may also be coated with a phosphate, for example, of aluminium, titanium, zirconium or cerium. An amount of phosphate (as $P_2O_5$) in the range 0.1% to 3%, by weight on $TiO_2$, has been found very suitable.

The presence of a coating of material such as a metal oxide, particularly of aluminium oxide, is believed to assist in forming a surface upon the particles which is particularly receptive to the coatings of the present invention.

The coating compounds of the present invention may be liquids or solids. For example, triethanolamine phosphate is normally a viscous liquid whereas triisopropanolamine is normally a solid of low melting point; the titanate of triisopropanolamine is generally a liquid, and the phosphate a solid. The benzoate of triisopropanolamine is a water-soluble compound which may be conveniently made by mixing the base and benzoic acid in water to give an aqueous solution of the compound.

The compound may, of course, exist in different physical forms depending upon the conditions, for example, the temperature. The physical form (i.e., liquid or solid) may also depend, in some instances, upon the degree of polymerization of the coating compounds. The most convenient method of applying the compounds to the titanium dioxide particles will depend upon the properties of the available product.

Where the compound can be applied at temperatures in the range of about 80° C. to 250° C. it is very convenient to apply the material during fluid energy milling of the titanium dioxide by introducing the material into the mill either with the pigment or separately. Alternatively, the compound may be applied in solution in an organic solvent or in water or, where appropriate, they may be melted and applied in the liquid state. Under such circumstances, the solution or melt may be poured or sprayed onto the particles, preferably before milling the particles to break down aggregates which may be formed during the addition. Triisopropanolamine benzoate, in particular, is preferably applied to the pigment in aqueous solution.

Sufficient of the compound is preferably applied to the pigment particles by any suitable method to allow the particles to retain an amount of the added compound in the range of about 0.5% to 5% and particularly an amount in the range 1% to 3%, by weight on $TiO_2$.

The surface coating compositions containing the coated titanium dioxide particles of the present invention are generally priming compositions containing an organic film-forming material which may, for example, be an alkyd resin or modified alkyd resin such as an oil- or epoxy-modified resin or an oil medium such as linseed oil or a modified oil medium such as epoxy-modified oil. They may be air drying or stoving compositions.

If desired, water-soluble or water-dispersible resins may be used as the film-forming material, for example, media containing alkyd-amino, melamine-acrylic or water-soluble acrylic or phenolic-based resins.

The coated titanium dioxide particles are normally present in the coating composition in a pigment volume concentration in the range of about 15% to 50%, particularly in the range 25% to 35%.

The pigments of the present invention retain the inhibiting properties of the triisopropanolamine or alkanolamine compound with the high opacity and high degree of whiteness of the $TiO_2$ which enables them to be more readily covered by a decorative coating. Because of the latter properties, it may be possible, when using the compositions of the present invention, to dispense with an undercoat.

Furthermore, the amount of triisopropanolamine or alkanolamine compound of the present invention required to give acceptable corrosion inhibition, is much reduced since in the present invention it is present only in the form of a layer on the surface of the titanium dioxide particles where it is most effective for its purpose and where it is then used most efficiently.

The following examples show embodiments of the present invention.

EXAMPLE

Several coating compositions were allowed to drip onto a belt feed carrying rutile titanium dioxide particles which had already been coated with alumina (1.5%), titania (1.12%) and silica (0.5%) to a hopper from which the material was supplied to a fluid energy mill by steam injection. The form of the coating compositions and the amount retained on the pigment, after fluid energy milling, are set forth in the following Table I:

TABLE I

| Compound | Form in which compound is added | Amount retained after milling (percent by weight on $TiO_2$) |
|---|---|---|
| Triethanolamine phosphate | As a liquid at 60° C | 1.2 and 2.3 |
| Triisopropanolamine | do | 3 |
| Triisopropanolamine benzoate | Aqueous solution containing 10% water | 0.64 |

The coated titanium dioxide pigments thus produced were mixed at 32% pigment volume concentration with a medium oil length linseed oil-modified alkyd resin and the coating compositions thus produced were separately applied to burnish mild steel panels 6″ × 4″ to give a dry film thickness of about 20 microns.

The panels, after standing for seven days at 20° C. in a relative humidity of 65, were scratched with a cross through the paint film and were then exposed (in quintuplicate) in a heavily polluted industrial atmosphere for a period of 12 months. Under these conditions the compositions containing the pigment of the present invention were found to be generally as effective as similar coating compositions containing red lead and better than compositions containing zinc chromate and calcium plumbate which are well known colored corrosion-inhibiting pigments.

Similar coating compositions containing rutile titanium dioxide particles coated with equal quantities of alumina, titania and silica but without the organic coatings of the present invention, were also tested under the same conditions.

The results obtained in the exposure tests are given in Table II.

Coated panels using the pigments of the present invention and prepared in a similar manner to that described above were also subjected to the following tests:

TEST I

This was a salt spray test as set out in Defense Specification DEF 1053 No. 24 using an intermittent salt spray which was applied for a total of 336 hours in a 3-week period.

TEST II

This was similar to Test I but the salt spray, which was made up to simulate rain water in a heavily polluted industrial area, contained the following ingredients:

| | G. |
|---|---|
| Ammonium sulfate | 7.10 |
| Calcium chloride (anhyd.) | 12.00 |
| Sodium sulfite | 16.30 |
| Sodium sulfate | 12.40 |
| Potassium nitrate | 0.065 |
| Potassium nitrite | 0.074 |
| Water to 20 liters. | |

This spray had a pH value of about 4.

Spraying with this solution provides a much more rigorous test of anticorrosion properties than does that given under Test I.

Similar tests were also carried out on similar coating compositions which contained: (a) zinc chromate pigment; (b) calcium plumbate pigment; and (c) red lead pigment.

The results obtained with Tests I and II and in the exposure test were graded A, B and C against the results of the panels which were coated with the paint composition containing rutile $TiO_2$ pigment coated with 1.5% alumina, 1.12% titania and 0.5% silica but without any organic coating.

The categories A, B and C varied in each test and they are noted at the foot of each table.

TABLE II.—TEST I

| Order of performance | Pigment | Organic coating | Amount of organic coating, percent | Category |
|---|---|---|---|---|
| 1 | Calcium plumbate | | | A |
| 2 | Zinc chromate | | | A |
| 3 | $TiO_2$ | Triisopropanolamine | 0.6 | A |
| 4 | $TiO_2$ | do | 3 | A |
| 5 | $TiO_2$ | Triethanolamine phosphate | 1.2 | A |
| 6 | Red lead | | | B |
| 7 | $TiO_2$ | | | C |

Note.—Category A corrosion estimated as 0–20% of standard. Category B corrosion estimated as 20–50% of standard. Category C corrosion estimated as 50–100% of standard.

TABLE III.—TEST II

| Order of performance | Pigment | Organic coating | Amount of organic coating, percent | Category |
|---|---|---|---|---|
| 1 | Calcium plumbate | | | A |
| 2 | TiO₂ | Triethanolamine phosphate | 2.3 | A |
| 3 | Red lead | | | A |
| 4 | TiO₂ | Triisopropanolamine | 3 | A |
| 5 | TiO₂ | do | 0.65 | B |
| 6 | TiO₂ | | | C |
| 7 | ZnCrO₄ | | | C |

NOTE.—Category A corrosion estimated as 0 to 70% of standard. Category B corrosion estimated as 70 to 90% of standard. Category C corrosion estimated as 90 to 100% of standard (this test, as previously noted, is very rigorous).

The results of the exposure tests for the compositions of Table I are shown in Table IV.

The results of similar tests with paints containing red lead, zinc chromate and calcium plumbate pigments prepared as for Test II are also given.

TABLE IV.—ATMOSPHERE IN HEAVILY POLLUTED AREA

| Order of performance | Pigment | Organic coating | Amount of coating | Category |
|---|---|---|---|---|
| 1 | TiO₂ | Triethanolamine phosphate | 2.3 | A |
| 2 | Red lead | | | A |
| 3 | TiO₂ | Triethanolamine phosphate | 1.2 | A |
| 4 | TiO₂ | Triisopropanolamine | | A |
| 5 | Zinc chromate | | | B |
| 6 | Calcium plumbate | | | B |
| 7 | TiO₂ | | | C |

NOTE.—Category A corrosion estimated as 0% to 25% of standard. Category B corrosion estimated as 25% to 60% of standard. Category C corrosion estimated as 60% to 100% of standard.

The pigments of the present invention, when incorporated into the surface coating compositions, had in all cases, markedly superior opacity when compared with the other pigments tested.

What is claimed is:

1. Pigmentary titanium dioxide particles coated with a compound selected from the group consisting of the phosphates of alkanolamines of the general formula

wherein each of the Rs are separately selected from the group consisting of divalent aliphatic radicals containing two carbon atoms and divalent aliphatic radicals containing three carbon atoms, said coating being present on the particles in an amount in the range 0.5% to 5% (by weight on TiO₂).

2. Coated pigmentary titanium dioxide particles in accordance with claim 1 wherein said coating consists essentially of triethanolamine phosphate.

3. Coated pigmentary titanium dioxide particles in accordance with claim 1 wherein said coating consists essentially of triisopropanolamine phosphate.

4. Pigmentary titanium dioxide particles as claimed in claim 1 wherein the particles have a mean weight crystal size in the range 0.15μ to 0.35μ.

5. Coated pigmentary titanium dioxide particles in accordance with claim 1 wherein the particles additionally have a coating of at least one member selected from the group consisting of silica and the oxides and phosphates of aluminum, titanium, cerium and zirconium intermediate said titanium dioxide particle and said trialkanolamine phosphate coating.

6. Pigmentary titanium dioxide particles coated with a compound selected from the group consisting of triisopropanolamine and the benzoates thereof, said coating being present on the particles in an amount in the range 0.5% to 5% (by weight on TiO₂).

7. Coated pigmentary titanium dioxide particles in accordance with claim 6 wherein said coating consists essentially of triisopropanolamine.

8. Coated pigmentary titanium dioxide particles in accordance with claim 6 wherein said coating consists essentially of triisopropanolamine benzoate.

9. Pigmentary titanium dioxide particles as claimed in claim 6 wherein the particles have a mean weight crystal size in the range 0.15μ to 0.35μ.

10. Coated pigmentary titanium dioxide particles in accordance with claim 6 wherein the particles additionally have a coating of at least one member selected from the group consisting of silica and the oxides and phosphates of aluminum, titanium, cerium and zironcium intermediate said titanium dioxide particle and said triisopropanolamine compound coating.

References Cited

UNITED STATES PATENTS

| 2,671,031 | 3/1954 | Whately. |
| 2,668,776 | 2/1954 | Miller. |
| 2,737,460 | 3/1956 | Werner. |
| 2,819,174 | 1/1958 | Vartanian. |
| 3,015,573 | 1/1962 | Myers et al. |
| 3,086,877 | 4/1963 | Sheehan et al. 106—300 |
| 3,127,280 | 3/1964 | Whately. |
| 3,141,788 | 7/1964 | Whately. |
| 3,172,772 | 3/1965 | Rowe. |
| 3,337,300 | 8/1967 | Hughes 106—309 XR |

TOBIAS E. LEVOW, Primary Examiner

H. M. S. SNEED, Assistant Examiner

U.S. Cl. X.R.

106—14; 260—37, 40, 41